United States Patent [19]
Santucci et al.

[11] Patent Number: 5,728,976
[45] Date of Patent: Mar. 17, 1998

[54] DETACHABLE COVER FOR WIRE DUCTS HAVING A LIVING HINGE

[75] Inventors: Donald Santucci; Mark Page, both of Naperville, Ill.

[73] Assignee: DEK, Inc., St. Charles, Ill.

[21] Appl. No.: 653,956

[22] Filed: May 22, 1996

[51] Int. Cl.$^6$ ........................................ H01B 7/00
[52] U.S. Cl. ........................................ 174/135; 174/683
[58] Field of Search .................... 174/68.1, 68.3, 174/95, 96, 97, 98, 100, 101; 428/34.7, 217

[56] References Cited

U.S. PATENT DOCUMENTS

| | | | |
|---|---|---|---|
| 3,126,444 | 3/1964 | Taylor | 174/101 |
| 3,229,029 | 1/1966 | Weiss | 174/101 |
| 4,188,765 | 2/1980 | Jackson | 52/716.8 |
| 4,857,670 | 8/1989 | Frank | 174/68.3 |
| 4,877,672 | 10/1989 | Shreiner | 428/156 |
| 4,907,767 | 3/1990 | Corsi et al. | 248/49 |
| 5,235,136 | 8/1993 | Santucci et al. | 174/68.3 |
| 5,274,194 | 12/1993 | Belcher | 174/50 |

FOREIGN PATENT DOCUMENTS

| | | | |
|---|---|---|---|
| 2608329 | 6/1988 | France | 174/68.3 |
| 405022826 A | 1/1993 | Japan | 174/68.3 |
| 406165339 A | 6/1994 | Japan | 174/68.3 |

*Primary Examiner*—Kristine L. Kincaid
*Assistant Examiner*—Kamand Cuneo
*Attorney, Agent, or Firm*—R. Winston Slater

[57] ABSTRACT

A reclosable cover for converting a two-piece electrical wire and cable duct system into a one-piece reclosable duct. The cover is fabricated from a dual-durometer plastic co-extrusion having a flexible hinge portion extruded of a resilient lower durometer plastic material. A clip assembly formed along one edge of the cover includes a modified U-shaped channel to receive and clamp the top end of a duct channel sidewall. Flexible fins are provided within this channel to further locate and retain the duct cover. A generally V-shaped hinge support member and dual ridges provide enhanced hinge integrity and an interference engagement therebetween to provide a cover 'remain-open' function. The clip assembly and support member share common elements to thereby improve on the space and cost efficiency of the duct cover.

13 Claims, 2 Drawing Sheets

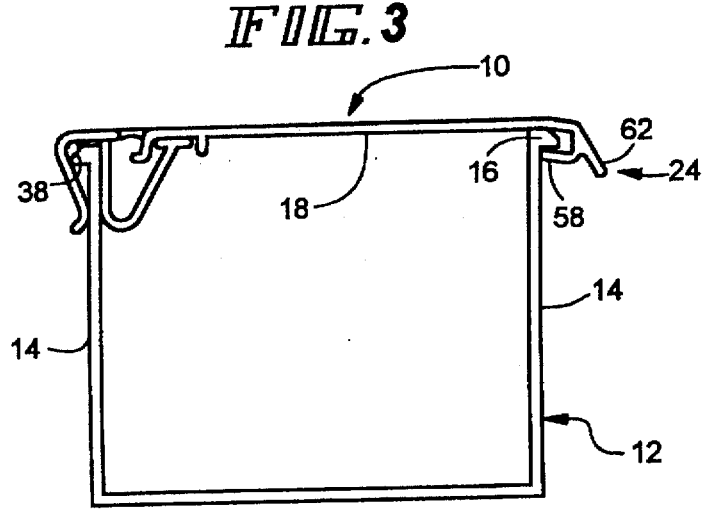
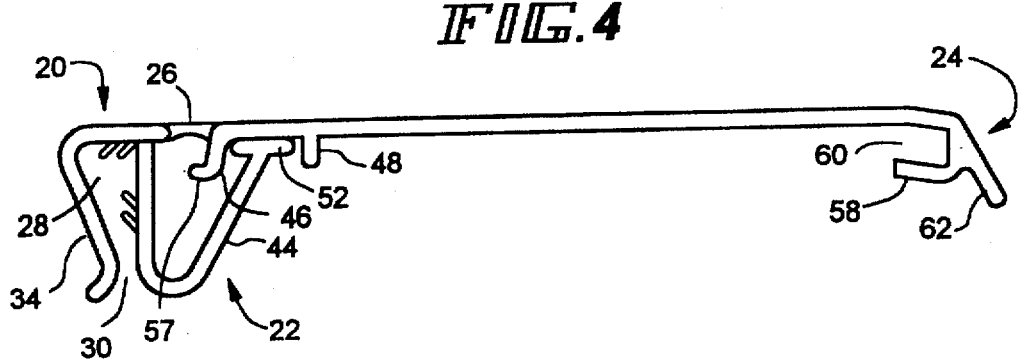
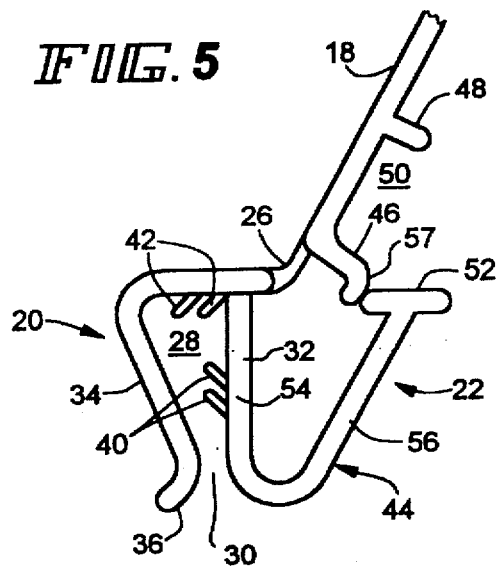

DETACHABLE COVER FOR WIRE DUCTS HAVING A LIVING HINGE

BACKGROUND OF THE INVENTION

The present invention relates generally to duct systems for the containment of electrical wiring, conduits, or other similar objects and, in particular, to an add-on cover for a two-piece duct system that, in combination with the open duct channel potion of such two-piece system, functions as a one-piece reclosable duct.

The present invention represents an improvement over applicant's earlier plastic duct system described in U.S. Pat. No. 4,602,124. This latter duct system, the disclosure of which is hereby incorporated by reference, describes a conventional two-piece duct arrangement whereby the cover forms a second detachable member that is removable from, but snaps over the first channel member to effect closure.

Although one-piece duct systems are known, many of the known systems exhibit deficiencies that render the respective structures unsuitable as a repeated access channel system. (Applicant's one-piece duct system, U.S. Pat. No. 5,235,136, has addressed many of the noted deficiencies. As described in more detail below, the present invention seeks to incorporate the benefits of a reclosable one-piece duct into a two-piece system while, in addition, adding certain other benefits and features hereto-fore unknown.) The disclosure of U.S. Pat. No. 5,235,136 is incorporated herein by reference.

In one system, for example, the channel and channel cover are integrally extruded. These members are interconnected by a thin hinge section—also forming part of the integral extrusion—and fabricated from the same relatively rigid plastic material forming the associated channel and cover. The hinge is made "thin" to secure the desired flexibility.

This system performs acceptably as long as repeated access to the duct channel is not required as, by way of example, when additional cables or cable rewiring is attempted. Although new wiring installations can often be planned and effected with a single duct access, it is not uncommon in such instances that changing circumstances dictate subsequent modification—i.e. the removal, addition, or rerouting of wires and cables—with its corresponding repeated flexure of the thin hinge material. Hinges extruded from the same material as that of the channel and cover are inherently brittle and fatigue after relatively few closure cycles. Any failure of the hinge, i.e. by the cracking separation thereof, quickly propagates along the entire longitudinal distance of the extrusion thereby rendering further use of the duct channel impossible.

The present system does not employ a thin hinge member fabricated of the same rigid plastic material defining the basic channel and cover. Rather, a co-extrusion process, generally of the type described in U.S. Pat. No. 5,235,136, is employed whereby the hinge is simultaneously extruded with the channel clasping, channel latching, and channel cover members (described below) as a single integral structure, but where dual-durometer materials are employed permitting a hinge of a more flexible, lower durometer plastic composition to be incorporated. Such material is inherently more flexible and is suitable for a large number of flexures. In this manner repeated access to the duct system may be achieved without the corresponding system failures common with single material extrusion designs.

The use of lower durometer hinge materials, however, has not heretofore met with complete success—such use generating its own unique set of deleterious effects resulting in a less than satisfactory duct system. These effects are attributable to the very flexure property of low such durometer material that renders it suitable as a hinge material in the first instance. Low durometer hinges have been observed to flex both in the transverse lateral and downward modes. Such flexure can result in improper latching of the duct cover and channel (i.e. maintenance of the "closed" condition of the duct system) as well as the compression of duct upon inadvertent duct contact, for example, through movement of furniture or striking by persons walking nearby. Such compression may cause visually observable distortions to the duct (i.e. aesthetically displeasing) as well as compromising or aggravating the above-noted latching problem.

The present duct cover, when combined with a conventional U-shaped duct channel, simulates the one-piece duct arrangement of applicant's earlier duct system (again, U.S. Pat. No. 5,235,136) thereby providing the advantages of multiple access afforded by dual-durometer extrusion while largely eliminating the associated difficulties.

A modified tension arm or support member is proposed. This member is integrally extruded of the higher durometer plastic material as part of the cover extrusion process but serves not merely to reinforce and support the lower durometer hinge, itself, but as an integral portion of the duct channel cover-to-channel attachment clip and, further, as a supporting arm for a cover 'maintain-open' feature, discussed below.

In contrast to the applicant's '136 one-piece duct system, the lower durometer hinge of the present reclosable cover is positioned in the upper or top surface of the duct cover (i.e. in the cover surface parallel to the duct channel base). As a consequence, the modes of hinge deformation are not the same as found in that earlier duct system and, in fact, are generally disposed or rotated ninety degrees from those shown in the '136 patent. A new support member and cooperating support member receiving structure have been developed to accommodate this changed hinge geometry.

More specifically, the support member is U or V-shaped having the upper or distal end of a first side of the "U" rigidly affixed to the top cover and, further, with said one side operating, as noted, in combination to define a channel wall clip. The remaining side of the U-shaped support member is 'free', that is, its distal end is not attached to the cover, rather, this side serves as a cantilever member, importantly, to support and resist downward deflections as well as bidirectional lateral transverse deflections of the cover.

To this end, a multi-functional engagement shelf is integrally formed on the distal end of the cantilever portion of the support member. This shelf is oriented substantially parallel to the cover and channel base surfaces and is disposed immediately adjacent, or in slightly biased abutting contact, to the cover itself. As such, any downward deflection of the cover, otherwise occasioned by the comparatively flexible nature of the lower durometer hinge, is resisted.

A second function of the above-described engagement shelf is to resist any transverse lateral deformation of the cover, either to the left or right. A pair of integral, extruded ridges depend downwardly from the cover (i.e. toward the interior of the duct channel as seen with the cover in its closed position), the ridges being positioned, respectively, adjacent the opposed edges of the engagement shelf. These ridges define a receiving channel for the support member shelf thereby capturing the shelf when the cover is closed. This capturing of the support member assures proper orientation of the support member as required to resist downward cover deflections. (In the absence of this capturing function, the support member may slide laterally along the inner surface of the cover thereby compromising its vertical support function.)

Further, by capturing the engagement shelf, the distal end of the support member is constrained into corresponding movement with any lateral displacements of the cover thereby resisting these undesirable displacements.

Finally, the engagement shelf serves yet another function. In cooperation with the 'inner' adjacent ridge ("inner" defines the ridge disposed within the U-shaped support member, i.e. the ridge closest to the hinge, itself), the shelf maintains the cover in its open position thereby facilitating placement, removal and general rewiring of cables and wires within the duct channel. More specifically, the inner ridge is oriented to interferingly engage the shelf as the cover pivotally rotates downwardly toward its closed position. As this interfering contact is made, the cover ceases further rotation, i.e. it remains in an elevated, open position. The lower, or distal end, of the inner ridge is preferably curved or otherwise contoured to provide a sloped camming engagement against the support member shelf. In this manner, the previously noted interference may be overcome by applying an additional closing pressure to the cover which displaces the engagement shelf laterally thereby causing it to seat within the channel as previously discussed.

It is therefore an object of the present invention to provide a cover for use with U-shaped wire duct or channel in which the combination of the present cover and channel functions as a one-piece plastic duct system thereby permitting the user to repeatedly open and close the cover, as required to facilitate the placement of wires and cables therein, without having to remove or reinstall the cover from or onto the channel.

It is a further object that the present cover, when installed on a duct channel, to facilitate substantially unlimited access in which the cover may be opened and reclosed numerous times thereby permitting reconfiguration of the wiring and cables therein. And it is therefore an object that the a hinge arrangement be provided within the cover and, further, that such hinge be integrally formed with said cover and not fatigue or otherwise break upon multiple opening and closing cycles of the duct/cover system.

It is a further object that a mechanism be provided to maintain the duct cover in its open position and that this mechanism shall include a release arrangement whereby users may effortlessly overcome the 'remain-open' mechanism to thereby close the duct cover.

It is yet another object of the present duct/cover system that the duct remain properly closed and latched and that the general cross-sectional contour and duct appearance remain substantially unchanged during normal usage.

Various other objects and advantages of the invention will hereinafter become more fully apparent from the following description of the embodiments and the drawings wherein:

FIG. 3 is a second elevation view of the duct cover and channel of FIG. 1 shown, however, with the reclosable duct channel cover of the present invention in the channel closed and latched position;

FIG. 4 is a side elevation view of the reclosable duct cover of the present invention; and, FIG. 5 is a fractional side elevation view of FIG. 4 showing details of the duct cover clip and hinge of the present invention with the cover in its open position.

DESCRIPTION OF THE PREFERRED EMBODIMENT

Figure 1:
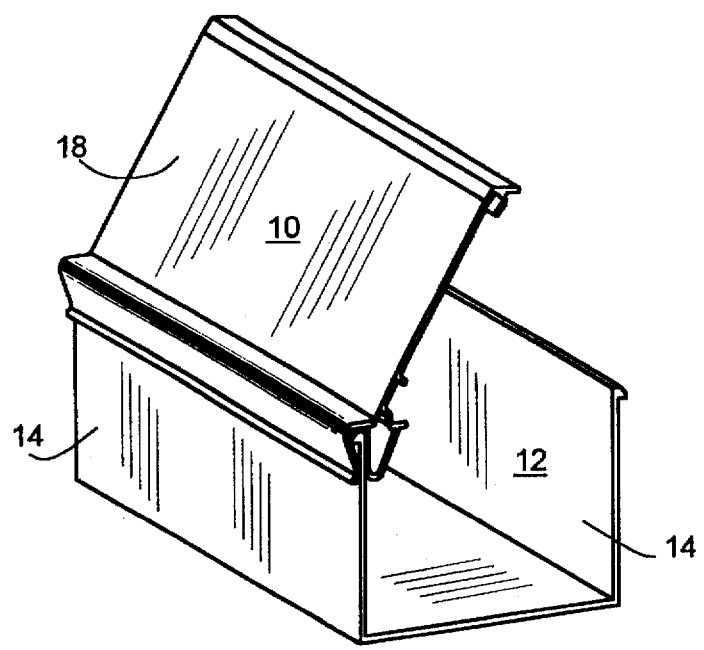
FIG. 1 is a perspective view of the present duct cover shown in combination with a U-shaped duct channel to define a pseudo one-piece duct system.
Figure 2:
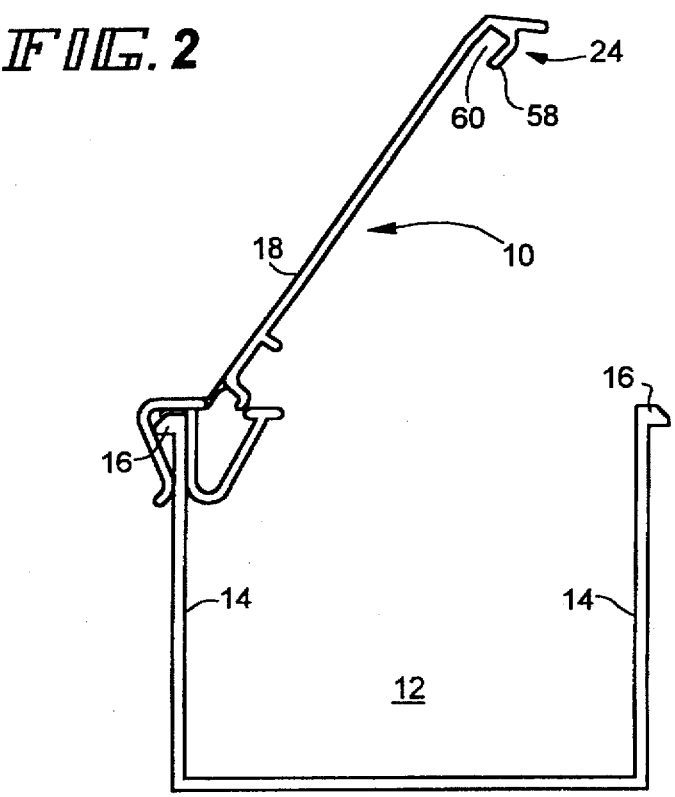
FIG. 2 is a side elevation view of the duct cover and duct channel of FIG. 1.

Referring to FIGS. 1–3, the reclosable duct channel cover 10 of the present invention is shown positioned onto a U-shaped duct channel 12. As shown, cover 10 and channel 12 form an essentially permanent combination, that is, once installed, it is not contemplated that the cover will thereafter require removal, or will be removed, from the channel. As such, the combination shown defines a one-piece reclosable duct system reminiscent of that taught by applicant's earlier duct system, see U.S. Pat. No. 5,235,136.

Channel 12 may be any U-shaped channel of conventional form. It is preferable, however, that the sidewalls 14 of channel 12 include outwardly-extending flanges 16 at the upper distal ends thereof. Such flanges are commonly incorporated on commercially available duct channel as latching means for retaining a separate channel cover (i.e. to be positioned on the duct channel after the latter is 'wired'). As described below, these flanges aid in the quasi-permanent mounting of the cover 10 to the channel 12, FIGS. 1 and 2 illustrate the present cover 10 in the duct channel 'open' position, while FIG. 3 depicts the cover in its 'closed' and latched position. FIG. 5 provides greater detail of the duct cover clip and hinge functions of the present cover, in particular, showing details of the cover 'remain-open' feature discussed in more detail below.

In addition to the planar top member 18 of the duct cover 10 (i.e. that portion of the cover that bridges the open duct channel thereby serving the actual channel enclosing function), cover 10 includes a clip assembly 20, a hinge assembly 22, and a latch 24—the latch serving to retain the cover in its closed position (see FIG. 3) on channel 12. The clip and hinge assemblies are thusly denominated by reason that each is comprised of plural structural members that cooperate to define the respective assemblies. Further, as set forth below, the clip and hinge assemblies 'overlap' in that certain of the structural members are advantageously shared by both assemblies.

With respect to the term assembly, it should be understood that all of the structural members forming the present duct cover 10, including the clip and hinge assemblies 20, 22, are integrally fabricated as a single extruded cover member employing a dual-durometer plastics co-extrusion process. More specifically, a cross-head device is employed to link a pair of extruders to a single die. One of the extruders supplies the relatively higher durometer PVC plastic that forms the correspondingly more rigid portions of the cover, for example, the top 18 and clip assembly 20 while the second extruder provides a lower durometer PVC material that defines that actual flexible hinge 26 of the corresponding assembly.

Referring to FIGS. 4 and 5, clip assembly 20 is defined by a receiving channel of modified ω-shape including an enlarged interior region 28 and a narrowed throat region 30 that, together, cooperate to receive and retain flange 16 on the upper edge of channel sidewall 14 (see FIGS. 2 and 3). More specifically, this channel is formed by inner and outer clip walls 32 and 34, respectively; the latter being angled to converge on the former to create the previously described throat region 30. The opening of the throat 30 is preferably dimensionally narrower than the corresponding thickness of the channel sidewall 14 in order to provide a clamping force by the clip assembly against the channel sidewall.

The lower portion of outer clip wall 34 is preferably contoured to form a widening throat aperture, in turn, defined by a throat camming surface 36 that co-act with the channel sidewall flange 16, for example at 38, to momentarily open the throat thereby admitting passage of the flange as the cover 10 is initially mounted to the duct channel 12.

Notwithstanding the above-noted clamping force, relative movement of the cover with reference to the duct channel to which it is 'snap-fitted' has been observed—particularly in connection with short duct sections. As a consequence, one or more deformable channel sidewall or top surface fins 40 and 42, respectively, may be provided to increase the frictional retention of the channel sidewall 14 within the clip assembly 20. These fins should be considered optional at least to the extent that the clip assembly 20, even in the absence of such fins, positively locks the cover 10 to the duct channel 12. Further, it has been found that the desired added frictional stability may be achieved with the top fins 42, therefore, sidewall fins 40 may be omitted.

With continuing reference to FIGS. 4 and 5, the hinge assembly 22 includes the actual low durometer PVC hinge 26, itself, as well as a cooperating support member 44, respective inner and outer downwardly depending ridges 46 and 48 which ridges, in turn, define a receiving channel 50 for capturing an engagement shelf 52 integrally formed as part of the support member. ("inner" and "outer" are defined with respect to the support member 44 and refer to whether the respective ridges are located within the U-shaped support member or outside thereof.) More specifically, the support member 44 is generally of V or U-shaped cross-section having one arm 54 of the U-shape integrally formed (i.e. extruded) to the cover 10 while the second arm 56 free-floats in cantilever fashion to provide the desired enhanced hinge integrity as well as, further, to support the cover in its so-called 'retain-open' orientation (discussed in more detail below). As previously noted, clip and hinge assemblies 20 and 22 share certain structural members thereby providing an added economy of design. Specifically, the inner wall 32 of the clip assembly and the fixed arm 54 of the U-shaped support member are, in fact, the same physical member.

FIGS. 4 and 5 best illustrate the interrelationships between the hinge support member 44 and the cooperating inwardly depending cover ridges 46, 48 and the channel 50 defined therebetween. With specific reference to FIG. 4 in which the cover is shown in the closed position, it will be seen that the engaging shelf 52, i.e. the cantilever end of the support member 44, is snugly positioned with receiving channel 50 in abutting contact against the lower surface of the cover top member 18. As thusly received, the support member functions to resist any downward deflection of the cover top member 18 (proximal to the hinge) as might occur by reason of the comparatively flexible nature of the low durometer PVC material comprising the hinge 26, particularly, should the duct cover be inadvertently struck.

It will be seen that the engagement shelf 52 is dimensioned to generally span the width of the receiving channel defined between the inwardly depending ridges 46, 48. As such, the outer ridge 48 serves two functions. First, ridge 48 restricts the rightward lateral movement of the cantilever support member (i.e., specifically, the engagement shelf 52) as would otherwise occur upon application of a downward 'deforming' force to the cover. In this manner, the support member is maintained immediately proximal to the hinge and, further, the high angle of engagement of the support member against the cover is maintained thereby assuring proper support member function.

The second function of outer support member 48 relates to the compressive deformation or 'buckling' of hinge 26 occasioned by a leftward lateral movement of the cover top member 18. While the intrinsic elasticity of the duct channel sidewalls 14 serves to resist such buckling, and even to return the hinge to its pre-compressed state (i.e. after removal of the lateral force that caused the deformation in the first instance), such deformation is nevertheless deemed objectionable. It was, in fact, one of the principal objectives of the support member of applicant's earlier '136 duct system to guard against just such hinge compression. However, it will be appreciated that the present hinge 26 could not be positioned in the channel sidewall (as it was in this earlier '136 duct system) by reason of the inclusion of the present clip assembly 20. Hinge 26 is, in short, oriented 90 degrees compared to the earlier '136 hinge (i.e. hinge 26 is now positioned within and essentially defining a portion of the top member 18) and, consequently, the vertical supporting capability of the present support member 44 provides no protection against hinge compressive buckling.

The inner depending ridge 46 similarly performs two independent functions. The first of these is to resist any stretching deformation of the hinge 26 as might otherwise permit the unexpected unlatching of latch 24 and the corresponding inadvertent opening of the duct channel.

The second function relates to the previously-denominated 'remain-open' feature of the present duct system. To this end, inner ridge 46 includes a sloped, cammed, or curved end region 57 that, as best shown in FIG. 5, is dimensioned and oriented to interferingly engage the inside edge of shelf 52. This interference resists the continued clockwise (i.e. closing rotation) of the top member 18 otherwise being urged by the elasticity of the hinge 26 and its intrinsic characteristic to return to its non-deformed linear contour, i.e. as shown in FIGS. 1, 2 and 4.

The previously noted curved end region 57, while not mandatory for proper cover 10 closure, nevertheless advantageously aids in the release of the cover top member 18. More specifically, the camming action provided by the curved or contoured surface at 57 facilitates the outward biasing of the cantilever support member (i.e. to the right) upon application of a downward force to the cover, thereby causing the engagement shelf 52 to be correspondingly moved to the right, in turn, avoiding the interference between the ridge and support member that, in the first instance, provided the 'remain-open' functionality. It will be understood that in the absence of a contoured end region 57, a downward pressure on the cover will ultimately overcome the limited supporting capacity of support member 44 thereby forcing such member downwardly until the inner ridge 46 has rotated out-of-contact with the supporting member shelf. (As the cover top member 18 is pivoted clockwise toward closure, ridge 46 correspondingly rotates both downwardly and to the left to thereby, as noted, clear the support member.) At such moment the shelf will snap into, and be received by, channel 50 as depicted in FIGS. 1, 2 and 4.

The non-hinged edge of cover top member 18 (i.e. the edge opposite clip assembly 20) is provided with a latch 24 designed to engage flange 16 on the corresponding opposed duct channel sidewall. Latch 24 is preferably defined by a lip 58 oriented below the cover top member and, in combination with the top member, forms a recess 60 adapted to receive flange 16 therein, in turn, latching the cover in its channel-closed position. A second lip or flange 62 may be provided as a handle to aid in the release of the sidewall flange 16 from recess 60 to again open the duct in conformity with one of the principal objects of the present invention, to provide for essentially unlimited access to, and reclosure of, the duct channel.

While the preferred embodiments have been described, various alternative embodiments may be utilized within the scope of the invention which is limited only by the following claims and their equivalents.

The invention claimed is:

1. A reclosable cover for converting a two-piece wire and cable duct system having a generally U-shaped elongate channel defined by a base and two opposed sidewalls, into a multiple re-access and reclosable integral duct system, said reclosable cover defining first and second edges along respective opposed sides thereof and including clip means integrally associated with the reclosable cover, said clip means disposed along said first edge for attaching the cover to one of the two opposed sidewalls of the U-shaped channel; an elongate, generally planar, top cover means for covering and enclosing the U-shaped channel; hinge means between and integrally formed with the clip means and the top cover means, said hinge means being adjacent said reclosable cover first edge, the hinge means permitting the pivotal rotation of the top cover means between a first closed position whereby the top cover means is generally parallel to the U-shaped channel base and substantially bridges said two opposed sidewalls thereby closing the U-shaped channel and a second open position whereby the top cover means is pivoted upwardly to expose the U-shaped channel whereby cables and wires may be added and removed from the channel.

2. The reclosable cover, for converting a two-piece wire and cable duct system, into a multiple re-access and reclosable integral duct system of claim 1 in which the clip means includes at least one flexible fin for frictional engagement with said two opposed sidewalls.

3. The reclosable cover, for converting a two-piece wire and cable duct system, into a multiple re-access and reclosable integral duct system of claim 1 including remain-open means for maintaining the top cover means in said second open position whereby cables and wires may be added and removed from the U-shaped channel without having to otherwise hold the cover in an open orientation.

4. The reclosable cover, for converting a two-piece wire and cable duct system, into a multiple re-access and reclosable integral duct system of claim 3 in which the remain-open means includes a support means rigidly connected to, and extending from, the clip means; and ridge means extending from the top cover means whereby the ridge means interferingly engages said support means when said top cover means is pivoted to said second open position whereby said interfering engagement maintains the top cover means in said second open position; said support means further positioned in abutting contact with the top cover means when said top cover means is in said first closed position whereby the support means performs the dual function of maintaining said top cover means in said second open position and supporting the top cover means against transverse downward deflection when said top cover means is in said first closed orientation.

5. The reclosable cover for converting a two-piece wire and cable duct system, into a multiple re-access and reclosable integral duct system of claim 3 in which the remain-open means includes a support means rigidly connected to, and extending from, the clip means; and ridge means extending from the top cover means whereby the ridge means interferingly engages said support means when the top cover means is pivoted to said second open position whereby said interference maintains the top cover means in said second open position.

6. The reclosable cover, for converting a two-piece wire and cable duct system, into a multiple re-access and reclosable integral duct system of claim 5 whereby the ridge means defines, at the point of interference with the support means, a contoured region whereby said contoured region forces the support means laterally out of said interfering engagement upon the application of a downward, pivotal closing force against the top cover means whereby the remain-open means is released and said top cover means thereafter is permitted to rotate to said first closed position.

7. The reclosable cover for converting a two-piece wire and cable duct system into a multiple re-access and reclosable integral duct system of claim 5 wherein the ridge means is positioned on the top cover means whereby the ridge means lies adjacent the support means when the cover is in said first closed orientation whereby the ridge means co-acts against the support means to inhibit the lateral movement of the top cover means whereby said ridge means performs the dual function of retaining the top cover means in said second open position and inhibiting lateral cover deformations.

8. A reclosable cover for converting a two-piece wire and cable duct system having a generally U-shaped elongate channel defined by a base and two opposed sidewalls, into a multiple re-access and reclosable integral duct system, said reclosable cover defining first and second edges along respective opposed sides thereof and including clip means integrally associated with the reclosable cover, said clip means disposed along said first edge for attaching the cover to one of said two opposed sidewalls of the U-shaped channel; an elongate, generally planar, top cover means for covering and enclosing the U-shaped channel; hinge means between and integrally formed with the clip means and the top cover means, said hinge means being adjacent said reclosable cover first edge, the hinge means permitting the pivotal rotation of the top cover means between a first closed position whereby the top cover means is generally parallel to the U-shaped channel base and substantially bridges said two opposed sidewalls thereby closing the U-shaped channel and a second open position whereby the top cover means is pivoted upwardly to expose the U-shaped channel whereby cables and wires may be added and removed from the channel; means for supporting the hinge means against deformation caused by the application of a lateral or downward force against the cover.

9. The reclosable cover, for converting a two-piece wire and cable duct system, into a multiple re-access and reclosable integral duct system of claim 8 including integral first, second, and third elongate members; said first and second elongate members forming said clip means wherein said first and second members are rigidly interconnected at the top ends thereof and oriented adjacent one-another to thereby define a duct sidewall receiving slot therebetween; said second and third elongate members forming said hinge supporting means wherein said second and third members are rigidly interconnected at the lower ends thereof to define said hinge support means with a generally U-shape in which the top end of the third elongate member is disposed in generally abutting contact to the top cover means adjacent the hinge means when the top cover means is pivoted downwardly to said first closed position whereby the clip and support means share said second elongate member thereby affording reduced physical space and cost.

10. The reclosable cover, for converting a two-piece wire and cable duct system, into a multiple re-access and reclosable integral duct system of claim 8 wherein the hinge means is fabricated of a lower durometer plastic material than that of the top cover means and said hinge means and top cover means are co-extruded together and wherein the hinge means is defined substantially within the plane defined by the top cover means and wherein the hinge supporting means includes a cantilever member, said member being rigidly attached to the clip means on one side of the hinge means and extending across the hinge means into substantially abutting contact with the top cover means when said cover is in said first closed position whereby said member resists any transverse, downward deflections of the top cover means.

11. The reclosable cover, for converting a two-piece wire and cable duct system, into a multiple re-access and reclosable integral duct system of claim 8 wherein the hinge means is fabricated of a lower durometer plastic material than that of the top cover means and said hinge means and top cover means are co-extruded together and wherein the hinge means is defined substantially within the plane defined by the top cover means and wherein the hinge supporting means includes a U-shape having first and second legs defining the sides of said U-shape, the top of said first leg being rigidly attached to the clip means on one side of the hinge means, the top of said second leg extending across the hinge means into substantially abutting contact with the top cover means when said cover is in said first closed position whereby said member resists any transverse, downward deflections of the top cover means.

12. The reclosable cover, for converting a two-piece wire and cable duct system, into a multiple re-access and reclosable integral duct system of claim 11 further including an engagement shelf on the top of the second leg and first and second ridges extending from the top cover means, said ridges being spaced apart and oriented, respectively, on opposed sides of the engagement shelf thereby defining a shelf receiving channel into which said engagement shelf is received when the top cover means is pivoted downwardly to said first closed position whereby said ridges serve to inhibit transverse, lateral movement of the top cover means.

13. The reclosable cover, for converting a two-piece wire and cable duct system, into a multiple re-access and reclosable integral duct system of claim 11 further including an engagement shelf on the top of the second leg and at least one ridge extending from the top cover means, said ridge being oriented adjacent the engagement shelf when the top cover means is pivoted downwardly to said first closed position whereby said ridge serves to inhibit transverse, lateral movement of the top cover means.

* * * * *